Figure 1:
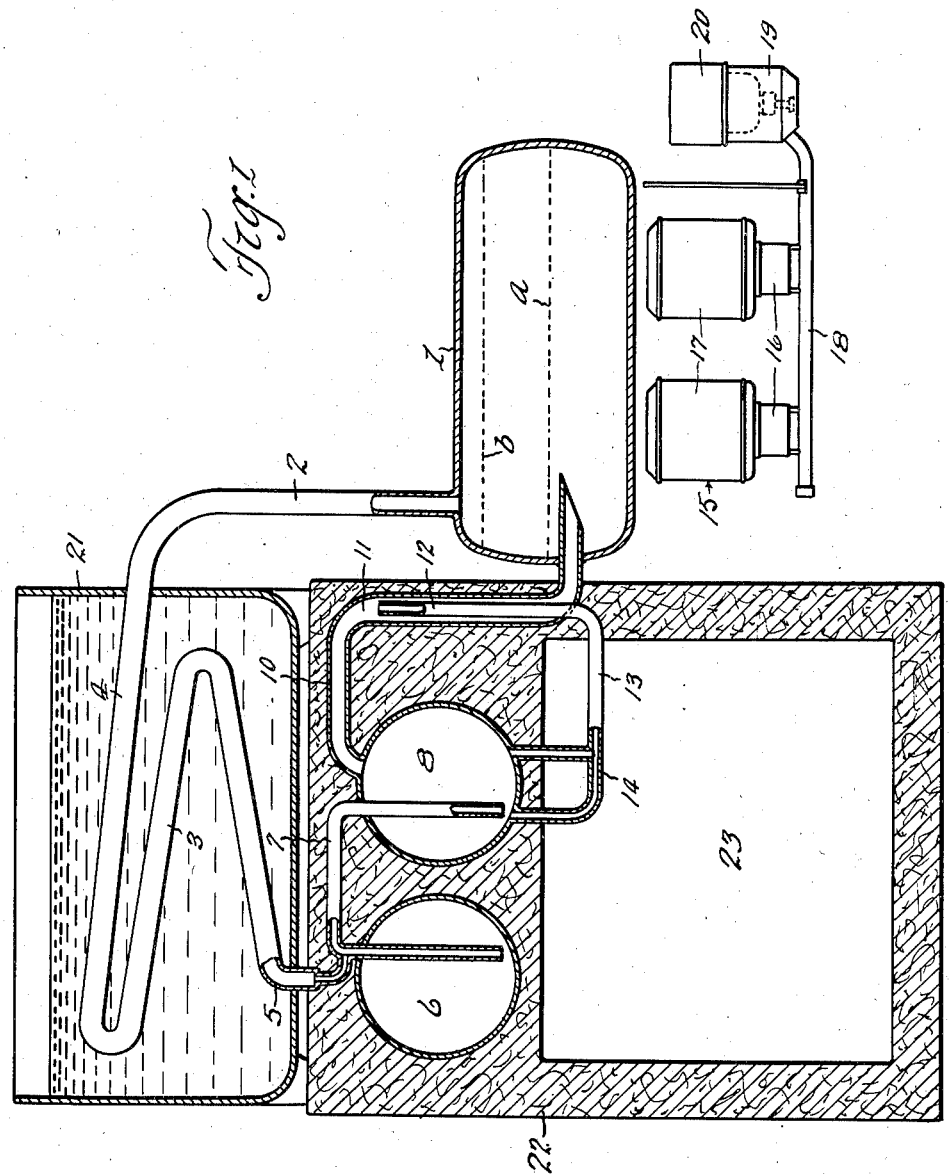

June 23, 1936.  M. RESEK  2,045,053
REFRIGERATING SYSTEM AND METHOD
Original Filed Oct. 20, 1933  2 Sheets-Sheet 1

INVENTOR.
Marc Resek
BY
Hull, Brock & West
ATTORNEYS.

June 23, 1936.  M. RESEK  2,045,053
REFRIGERATING SYSTEM AND METHOD
Original Filed Oct. 20, 1933   2 Sheets-Sheet 2

INVENTOR.
Marc Resek
BY
Hull, Brock & New
ATTORNEYS.

Patented June 23, 1936

2,045,053

UNITED STATES PATENT OFFICE 2,045,053

REFRIGERATING SYSTEM AND METHOD

Marc Resek, Cleveland Heights, Ohio, assignor to Perfection Stove Company, Cleveland, Ohio, a corporation of Ohio Application October 20, 1933, Serial No. 694,455
Renewed January 25, 1935

16 Claims. (Cl. 62—120.5)

This invention pertains to refrigeration apparatus or systems of the intermittent absorption class comprising, generally, a generator-absorber section, a condenser, a receiver-evaporator section, and a conduit for delivering vapors from the generator-absorber section to the condenser, a conduit for delivering condensate from the condenser to the receiver-evaporator section, and a conduit for returning gas from the receiver-evaporator section to the generator-absorber section, delivering it to the latter below the minimum liquid level therein for re-absorption, together with means for periodically administering heat to the generator-absorber section, the intervals between heating periods being known as cooling periods.

The invention also relates to a novel method of refrigeration, as will hereinafter appear.

The system is hermetically sealed and contains a quantity of a suitable refrigerant, such as ammonia, and a suitable absorbent therefor, such as water, in proper proportions, this mixture being known as the refrigerant liquor; and at the beginning of a cycle of operation, all or practically all of the liquor is present in the generator-absorber section. Upon heat being administered to such section, the liquor boils and a large percentage of the refrigerant is distilled over into the receiver-evaporator section, the vapors readily liquefying within the condenser under the pressures then prevailing within the system. Upon the cessation of heat and the consequential reduction of pressure, the anhydrous refrigerant within the receiver-evaporator section gasifies and returns to the generator-absorber section to be re-absorbed in the weak liquor in the latter section. In the foregoing operation, notwithstanding the employment of dehydrators, rectifiers, or the like, a small amount, at least, of aqueous condensate finds its way with the refrigerant condensate into the receiver-evaporator end of the system during practically every cycle of operation, and unless some means is provided for removing this aqueous solution, which may be termed residue liquid, from the receiver-evaporator section at relatively frequent intervals, its presence in the receiver-evaporator section will reduce the efficiency of the apparatus, the condition becoming gradually worse as the residue liquid increases in volume.

It is the primary purpose of my present invention to overcome the above evil by providing an arrangement whereby freshly condensed refrigerant is segregated and retained undiluted during the heating period while the residue liquid that remains in the receiver-evaporator section at the conclusion of the previous cooling period is being returned to the generator-absorber section during the prevailing heating period and which freshly condensed refrigerant will be liberated within the receiver-evaporator section at the beginning of the ensuing cooling period so that it may gasify and return to the generator-absorber during such period and in so doing perform its refrigerating function.

Other objects of the invention are the production of a refrigerating system of the above character that is practically automatic of operation (excepting for the little attention required in setting, in operation, the embodiment herein selected for illustrative purposes, it being obvious that the same could be made entirely automatic by the substitution of a self-controlled heating means for the one shown); to provide refrigeration apparatus of the character above described that is relatively simple of construction yet highly efficient and thoroughly dependable; the provision, in a system of the foregoing character, of means in the nature of a gas lift for returning the residue liquid from the receiver-evaporator section to the generator-absorber section which means, preferably, is motivated by heat liberated from hot liquid derived from the generator-absorber section of the system.

Figure 2:
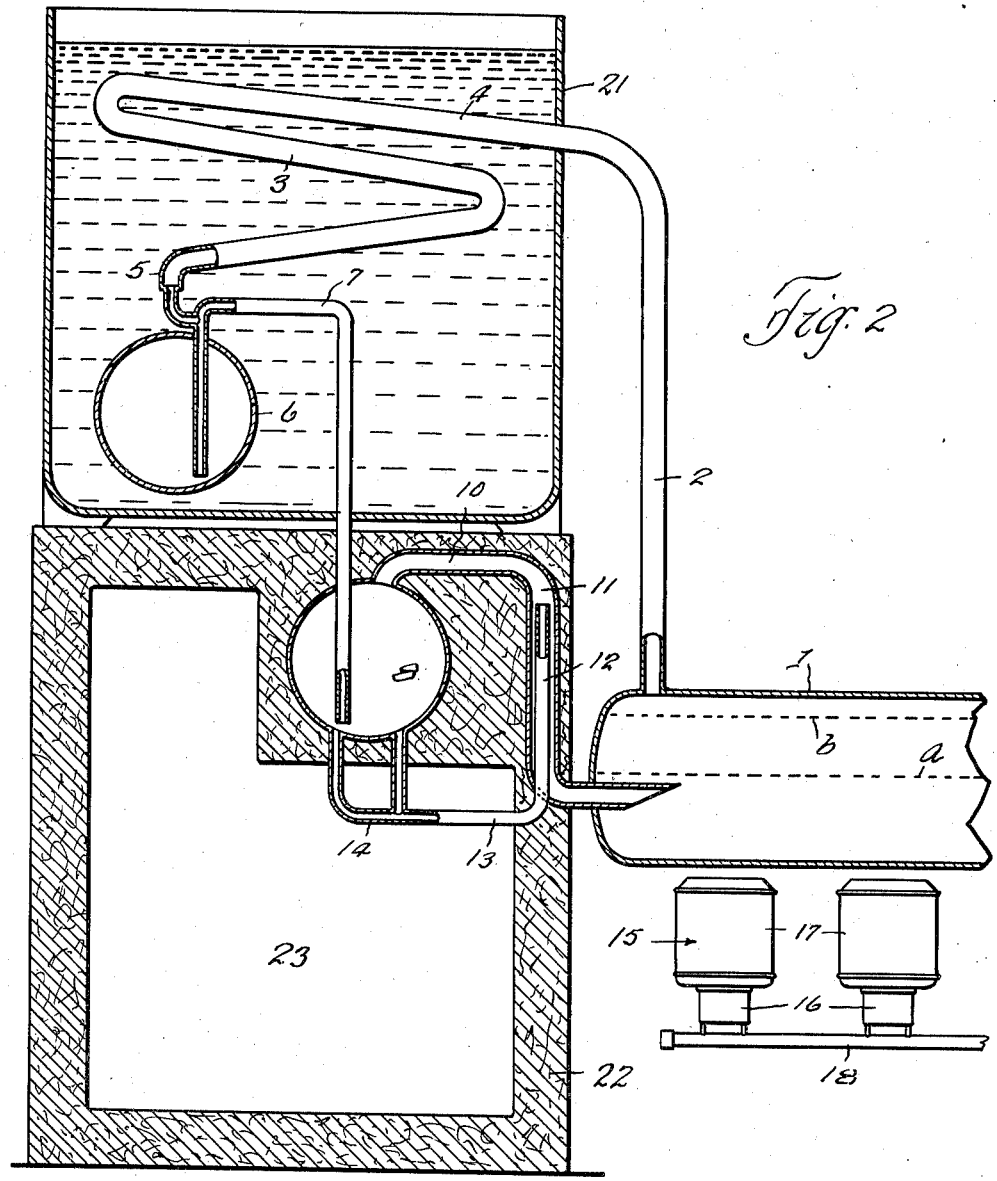

The foregoing objects and advantages, with others hereinafter appearing, are attained in the embodiments of the invention diagrammatically illustrated in Figs. 1 and 2 of the accompanying drawings, the latter view showing a modification of the system illustrated by the former view.

Referring to the parts by reference characterss, I designates the generator-absorber; 2 a vapor delivery conduit that leads to the condenser 3 through an upwardly inclined portion 4 that may constitute a dehydrator; 5 a conduit that leads from the condenser to a primary receiver 6, in the present instance a part of the latter forming a branch of a transfer conduit 7 that communicatively connects the primary receiver 6 with a secondary receiver 8, said transfer tube being shown as opening into said receivers adjacent the bottoms thereof. This is especially important with respect to the primary receiver 6. 10 is a gas return conduit that leads from the upper portion of the secondary receiver 8 to the generator-absorber 1 below the minimum liquid level therein, which level is indicated by the dotted line $a$. The maximum liquid level in said vessel is shown by the line $b$. The gas return conduit has a downwardly directed or vertical portion 11 within which rises a correspondingly disposed portion 12 of a liquid return conduit 13 that leads from a low part of the evaporator 14 that is situated below the plane of and communicates with the bottom portion of the secondary receiver 8 so that liquid from said receiver may gravitate into the evaporator. It will be noted that the portion 12 of the conduit 13 opens into the portion 11 of the conduit 10.

Heating means 15 is disposed below, or in operative relation to, the generator-absorber 1 and, in the present instance, is shown conventionally as an oil burning apparatus. This apparatus includes burners 16, having drums 17, and supplied with oil, through a pipe 18, from an open top vessel 19 over which a bottle-like reservoir 20 is inverted, such reservoir being of a capacity to supply just enough oil to sustain a heating period of a cycle of operation so that after the reservoir has been placed within the vessel 19 and the burners lighted, the apparatus will require no further attention until the next cycle of operation is to be initiated.

When the burners are lighted and heat is thus administered to the generator-absorber 1, the liquor therein boils and the resultant vapors pass through conduit 2 and dehydrator 4 into the condenser 3 where they are liquefied and from where they drain through the conduit 5 into the primary receiver 6 by way of the adjacent branch of the transfer conduit 7.

The dehydrator 4 and the condenser 3 are submerged in a body of cooling liquid, such as water, contained within a tank of receptacle 21. This tank may be supported upon the top of an insulated cabinet 22 that encloses a refrigeration compartment 23 within which is situated the evaporator 14. According to the embodiment illustrated in Fig. 1, the primary and secondary receivers, the transfer conduit 7, and much of the gas return conduit 10, including the downwardly directed or vertical portion 11 thereof, are shown as insulated within the top of the cabinet 22. Under this arrangement, the hot refrigerant condensate that collects within the primary receiver 6 will have no appreciable effect upon the temperature of the refrigeration compartment 23. The same result will be obtained, and with greater assurance that all vapors entering the primary receiver will be immediately condensed, by placing the primary receiver in the tank 21 of cooling liquid, as in the modification illustrated in Fig. 2.

During the heating period, the liquid from the generator-absorber that stands in the portion 11 of the gas return conduit 10 is hot and as a consequence thereof the portion 12 of the conduit 13 is heated, causing bubbles to be formed in the liquid that is in said portion 12, and these bubbles, rising, will create a flow of the liquid upwardly in said conduit portion 12 resulting in the liquid overflowing the tube 13 and mixing with the liquor in the generator-absorber. In other words, a so-called "gas lift" is effected which pumps the residue liquid from the evaporator and, if the quantity is sufficient, from the bottom portion of the secondary receiver 8, to the generator-absorber section of the system. This action continues as long as heat is thus supplied to the portion 12 of the conduit 13 and residue liquid remains in the receiver-evaporator section; and the heating period prevails until the supply of oil is exhausted from the reservoir 20. When such supply is spent, the burners go out, the system cools and the pressure therein falls. Because the pressure in all other parts of the system decreases before it does in the primary receiver 6, by reason of the fact that the only outlet from said receiver is liquid sealed, the anhydrous refrigerant that practically fills said receiver at the conclusion of the heating period is drawn over through the transfer conduit 7 into the secondary receiver 8. The residue liquid having been removed from the latter receiver and from the evaporator 14 during the heating period, the fresh charge of anhydrous refrigerant is deposited within the secondary receiver and in the evaporator undiluted and in readiness for a cooling period of maximum refrigerating effect. As the refrigerant evaporates the gas returns through the conduit 10 to the generator-absorber to be re-absorbed within the body of liquor therein.

In the appended claims, where the context so admits, the term "second receiver" may embrace both the secondary receiver and the evaporator.

It will be noted that, during the heating period, due to the slightly higher pressure existing in the generator, the liquid tends to rise in tube 11, standing in this tube a few inches higher than the liquid in the generator 1. Thus the liquid stands at a considerable depth around the tube 12, aiding in the transfer of heat to this tube and therefore accelerating the pumping action.

During the cooling period, however, the pressure in the evaporator is sufficiently above the pressure in the generator to clear the liquid out of tube 11, thus keeping tube 12 entirely out of contact with the comparatively warm liquid in the generator, substituting instead a very cold vapor returning from the evaporator, which will absolutely prevent any boiling in tube 12 during this period.

Having thus described my invention, what I claim is:

1. A refrigerating system including a generator-absorber section, a condenser, a receiver-evaporator section, and means for periodically heating the generator-absorber section, the intervals between heating periods being known as cooling periods; the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and a conduit leading from a low point in the receiver-evaporator section and having a portion extending upwardly and communicating with the generator-absorber section above the maximum liquid level therein, said upwardly extending portion being subjected to the temperature of the liquid in the latter section.

2. A refrigerating system including a generator-absorber section, a condenser, a receiver-evaporator section, and means for periodically heating the generator-absorber section, the intervals between heating periods being known as cooling periods; the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and residue liquid conveying means leading from a low point in the receiver-evaporator section and arranged to overflow into the generator-absorber section, a part of said means extending upwardly toward its overflow end and being subjected to heat from the latter section during the heating period.

3. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and means motivated by heat from the generator-absorber section for returning said residue liquid from the second receiver to the generator-absorber section during the next heating period.

4. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and a gas lift for returning said residue liquid from the second receiver to the generator-absorber section during the next heating period.

5. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and a conduit through which said residue liquid is returned from the second receiver to the generator-absorber section, said conduit being arranged to receive heat from the generator-absorber section during the heating period thereby to create gas bubbles within the conduit and induce a flow therein in the direction of the generator-absorber section.

6. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, and a conduit through which said residue liquid is returned from the second receiver to the generator-absorber section, the same having an upwardly directed portion arranged to receive heat from the generator-absorber section.

7. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, a conduit through which said residue liquid is returned from the second receiver to the generator-absorber section, the same including an upwardly directed portion, and means for administering heat to said portion.

8. A refrigerating system including a generator-absorber section, a condenser, a receiver-evaporator section, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by changes of pressure in the system at the beginning of the ensuing cooling period and to retain therein residue liquid after the completion of said cooling period, a conduit through which said residue liquid is returned from the second receiver to the generator-absorber section, the same having an upwardly directed portion arranged to receive heat liberated from hot liquid in the generator-absorber section.

9. A refrigerating system comprising a generator-absorber section, a condenser, a receiver-evaporator section, communicative means connecting said elements and including a conduit through which gas is returned from the receiver-evaporator section to the generator-absorber section, the same having a portion in which liquid from the generator-absorber section is present, means for periodically administering heat to the generator-absorber section, the intervals between heating periods being known as cooling periods, the receiver-evaporator section involving two intercommunicating receivers, one of which is arranged to receive freshly condensed refrigerant directly from the condenser during a heating period, and the second of which is adapted to have said refrigerant transferred to it by a change of pressure in the system at the beginning of the ensuing cooling period and to retain residue liquid after the completion of said cooling period, and a conduit through which said residue liquid is returned from the second receiver to the generator-absorber section, the same having an upwardly directed part in heat exchanging relation to the aforesaid portion of the gas return conduit.

10. A refrigerating system comprising a generator-absorber section, a condenser, a receiver-evaporator section, communicative means connecting said elements and including a conduit through which gas is returned from the receiver-evaporator section to the generator-absorber section, the same having an upwardly extended portion in which liquid from the generator-absorber section is present, means for periodically administering heat to the generator-absorber section, the intervals between heating periods being known as cooling periods, the receiver-evaporator section involving two receivers, one of which is arranged to receive freshly condensed refrigerant directly from the condenser during a heating period, and the second of which is adapted to have said refrigerant transferred to its by a change of pressure in the system at the beginning of the ensuing cooling period and to retain residue liquid after the completion of said cooling period, and a conduit through which said residue liquid is returned from the second receiver to the generator-absorber section, the same having an upwardly directed portion disposed within the upwardly directed portion of the beforementioned gas return conduit.

11. A refrigerating system comprising a generator-absorber, a condenser, means for delivering vapor from the generator-absorber to the condenser, a primary receiver, a secondary receiver, means through which condensate is delivered from the condenser to the primary receiver, a transfer conduit leading from the primary receiver to the secondary receiver, an evaporator communicating with the secondary receiver, a gas return conduit leading from the secondary receiver to the generator-absorber and opening into the latter at a point below the minimum liquid level therein, the gas return conduit having a downwardly extending portion in which liquid from the generator-absorber is present, and a conduit leading from a low part of the evaporator and having an upwardly extended portion arranged within the downwardly extending portion of the gas return conduit and opening into the latter above the maximum liquid level therein.

12. A refrigerator system comprising a generator-absorber, a condenser, means for delivering vapor from the generator-absorber to the condenser, a primary receiver, a secondary receiver, means through which condensate is delivered from the condenser to the primary receiver, a transfer conduit leading from the bottom portion of the primary receiver to the second receiver, an evaporator below the plane of and communicating with the secondary receiver, a gas return conduit leading from the secondary receiver to the generator-absorber and opening into the latter at a point below the minimum liquid level therein, the gas return conduit having a substantially vertical portion in which liquid from the generator-absorber is present, and a conduit leading from a low part of the evaporator and having a substantially vertical portion arranged within the corresponding portion of the gas return conduit and opening into the latter above the maximum liquid level therein.

13. A refrigerating system comprising a generator-absorber, a condenser, means for delivering vapor from the generator-absorber to the condenser, a primary receiver, a secondary receiver, means through which condensate is delivered from the condenser to the primary receiver, a transfer conduit leading from the bottom portion of the primary receiver to the secondary receiver, an evaporator below the plane of and communicating with the secondary receiver, a gas return conduit leading from the secondary receiver to the generator-absorber and opening into the latter at a point below the minimum liquid level therein, the gas return conduit having a downwardly extending portion in which liquid from the generator-absorber is present, a conduit leading from a low part of the evaporator and having an upwardly extended portion arranged within the downwardly extending portion of the gas return conduit and opening into the latter above the maximum liquid level therein, and an insulated cabinet enclosing a refrigeration compartment within which the evaporator is situated, the primary and secondary receivers, with the transfer conduit and the part of the gas return conduit including the downwardly directed portion, being encased within an insulated part of the cabinet.

14. A refrigerating system comprising a generator-absorber, a condenser, means for delivering vapor from the generator-absorber to the condenser, a primary receiver, a secondary receiver, means through which condensate is delivered by gravity from the condenser to the primary receiver, a transfer conduit leading from the bottom portion of the primary receiver to the secondary receiver, an evaporator below the plane of and communicating with the secondary receiver, a gas return conduit leading from the secondary receiver to the generator-absorber and opening into the latter at a point below the minimum liquid level therein, the gas return conduit having a downwardly extending portion in which liquid from the generator-absorber is present, and a conduit leading from a low part of the evaporator and having an upwardly extended portion arranged within the downwardly extending portion of the gas return conduit and opening into the latter above the maximum liquid level therein, an insulated cabinet enclosing a refrigeration compartment in which the evaporator is situated, and insulating means enclosing the primary and secondary receivers and the transfer conduit and a part of the gas return conduit including the downwardly extended portion thereof.

15. The method of refrigeration which consists in periodically heating a mixture of refrigerant and absorbent liquids in the generator-absorber section of the system to produce vapors therefrom; condensing said vapors and withholding the condensate from the evaporator section of the system until the conclusion of the heating period; during said heating period returning any residue liquid from the evaporator section to the generator-absorber section by a thermal action induced by heat from the generator-absorber section, thereafter effecting delivery of the condensate to the evaporator section, and during the ensuing cooling period returning the refrigerant in the form of gas from the evaporator section to the generator-absorber section.

16. The method of refrigeration which consists in periodically heating a mixture of refrigerant and absorbent liquids in the generator-absorber section of the system to produce vapors therefrom; condensing said vapors and by reason of the pressure then prevailing in the system withholding the condensate from the evaporator section of the system; during the heating period returning any residue liquid from the evaporator section to the generator-absorber section by a thermal action induced by the heat of the mixture in the generator-absorber section, and during the ensuing cooling period returning the refrigerant in the form of gas from the evaporator section to the generator-absorber section and allowing the condensate to enter the evaporator section by reason of a reduced pressure in the system.

MARC RESEK.